United States Patent Office 3,167,271
Patented Jan. 26, 1965

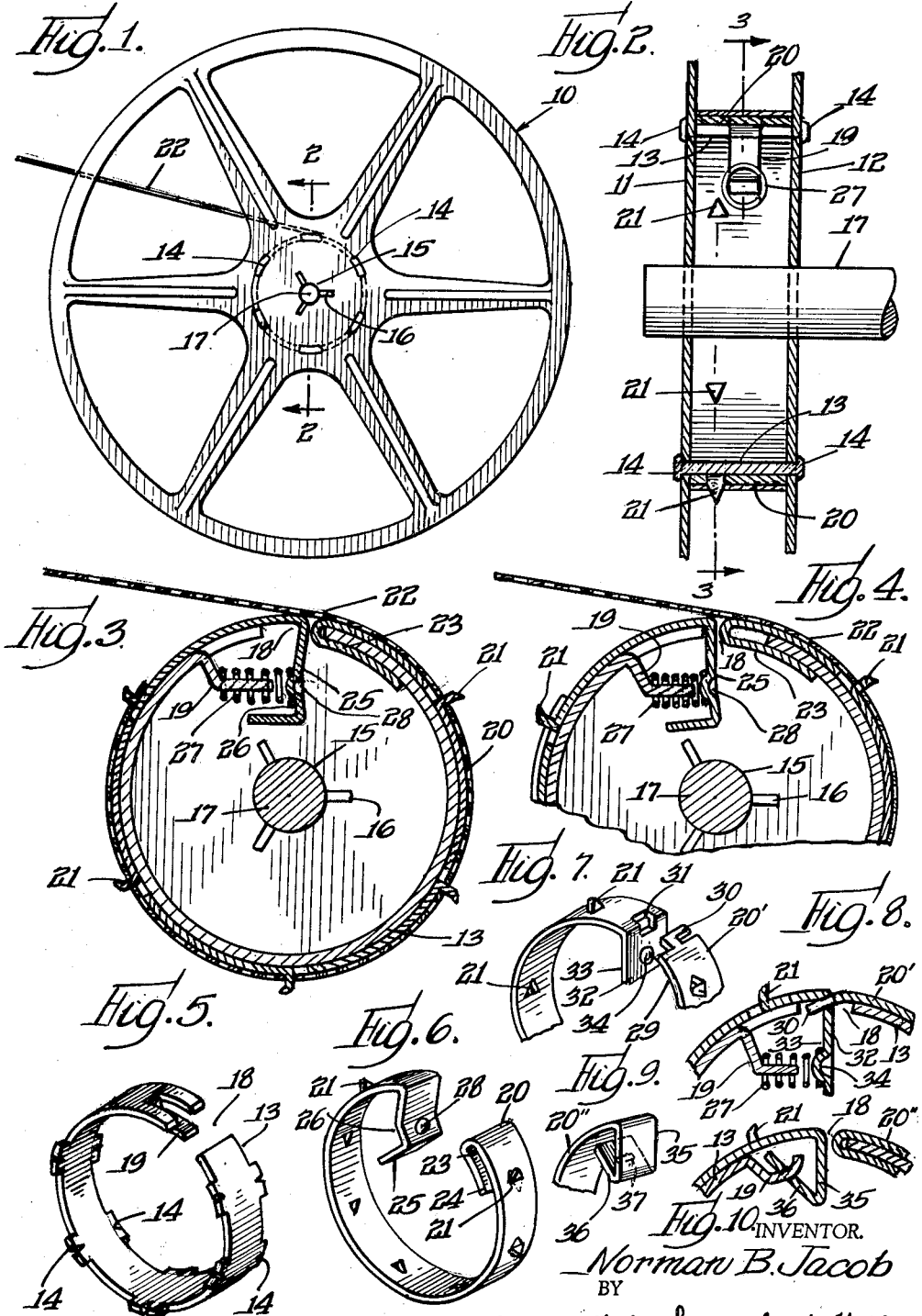

3,167,271
FILM REEL
Norman B. Jacob, Morton Grove, Ill., assignor to Keystone Ferrule & Nut Corp., Burlington, Wis., a corporation of Wisconsin
Filed Sept. 18, 1961, Ser. No. 138,659
12 Claims. (Cl. 242—74)

This invention relates to a motion picture film reel and, more particularly, to an improved motion picture film reel having utility as an automatic take-up reel in motion picture projectors.

A number of take-up reels for use in automatically winding motion picture film are now available, particularly for use on 8 and 16 mm. projectors. Some of these employ a rigidly secured hub or core having hooks or pins adapted to engage with the sprocket-receiving openings of the film as the end of the film is urged between the flanges or side plates of the reel. Other reels having utility in this connection employ modified hubs or flanges, or both, adapted to frictionally engage with the end of the film as it is guided between the flanges of the reel whereby the end of the film will be drawn into contact with the hub and be taken up thereon.

Typically the take-up reel in an automatic film winding operation is revolving at a speed greater than the rate of travel of the film being urged between the flanges of the reel. At the precise point when the film is firmly grasped by and secured on the hub or core of conventional take-up reels, the film experiences an immediate and sharp jolt. This phenomenon results from the inertial lag created between the slower moving film and the rapidly rotating reel as the film is taken up by the reel. Not uncommonly, the very substantial force exerted on the film at this point is of sufficient magnitude to cause tearing or mutilation of the film. While various approaches have been made to attempt to meet this problem, no adequately satisfactory means has been devised for coping with it.

The purpose of this invention is to provide a motion picture film take-up reel for use in connection with standard motion picture projection apparatus which will grasp, draw-in and securely hold the film without damaging it.

Another object of this invention is to provide a motion picture film take-up reel which is entirely automatic in its operation and substantially fool-proof.

Still another object of this invention is to provide a motion picture film take-up reel which will effectively enable film to be wound thereon, and allow easy and quick removal of film therefrom, without damage to the film.

Yet another object of this invention lies in the provision of a motion picture film take-up reel comprised of relatively few parts adapted to be easily assembled and economic of manufacture.

Other objects and advantages will appear from the more detailed description to follow.

In accomplishing the above objects, the reel is formed from side plates or flanges secured in spaced apart relation by means of a substantially centrally disposed hub. The hub is provided with a concentric collar or sleeve or second hub having means for engaging with the sprocket-receiving openings of film to be wound on the reel. The sleeve additionally, however, is provided with means for coacting and cooperating with means associated with the hub of the reel which serve to normally bias the sleeve in the direction of the rotational movement of the reel and which respond to and compensate for the inertial lag between the film and the reel as the film is grasped by and secured to the hub of the reel.

Referring to the drawings which illustrate several preferred embodiments of the present invention, but to which the present invention is not restricted since the drawings are merely by way of illustration and not by way of limitation:

FIG. 1 is a side elevational view of the reel.

FIG. 2 is a cross sectional view taken along line 2—2 of FIG. 1.

FIG. 3 is a cross sectional view taken along the line 3—3 of FIG. 2 showing the sleeve in its normally biased position.

FIG. 4 is a fragmentary view showing the sleeve in its operative position at the instant the film is grasped by the reel.

FIG. 5 is a perspective view of the hub of the reel.

FIG. 6 is a perspective view of one embodiment of the sleeve.

FIG. 7 is a fragmentary perspective view of another embodiment of the sleeve.

FIG. 8 is a fragmentary sectional view of the embodiment of the sleeve shown in FIG. 7 mounted on the hub of the reel.

FIG. 9 is a fragmentary perspective view of one end of still another embodiment of the sleeve.

FIG. 10 is a fragmentary sectional view of the embodiment of the sleeve illustrated in FIG. 9 in operative position on the hub of the reel.

Referring now to the drawings for a more detailed explanation of my motion picture film reel, the reel, designated generally at 10, comprises flanges or side plates 11 and 12 supported upon a core or hub 13 by means of projections 14 extending from the hub 13 into slots in the flanges 11 and 12. The projections 14 may be suitably expanded to hold the various parts firmly and rigidly together. The flanges 11 and 12 may be of conventional design and may be constructed of any suitable material and in any manner known to the art.

The flanges 11 and 12 are provided with a centrally disposed opening 15, the flanges 11 being preferably modified to form spline grooves or keyways 16 adapted to receive a correspondingly shaped reel-actuating shaft or spindle 17. By providing only one of the flanges with such grooves, as is broadly conventional in the art, the possibility of error by the operator in placing the film reel in proper position on the spindle 17 is eliminated.

Referring now in particular to FIG. 5, the hub 13 is most desirably formed of a single piece of metal, the ends of the hub 13 being spaced from each other and substantially concentric with each other thus providing an open passageway or slot 18. The hub 13, in addition, is provided with a depressed extension or lug 19 preferably integral with and struck from one end of the hub 13, the function of which will be made clear as the description proceeds.

A collar or sleeve or second hub 20, illustrated in FIG. 6, is adapted to be received by and slidably engage with the hub 13. The sleeve 20 is desirably constructed of a resilient material such as spring steel and is provided with a series of projections or pins 21 for engagement with the sprocket-receiving openings of a film strip 22 to be wound on the reel 10. The pins 21 may be conveniently struck from the same material as the sleeve 20. To enable the pins 21 to more readily grasp and engage with the sprocket-receiving openings of the film 22, the ends of the pins 21 advantageously are curved slightly at their extremities in the general direction of the rotational movement of the reel 10.

In the embodiment of the sleeve 20 illustrated in FIG. 6, one end 23 thereof is modified to form a reentrant slot 24 adapted to receive an end of the hub 13 as illustrated in FIGS. 3 and 4. The other end 25 of the sleeve 20 is most desirably constructed so as to extend into the interior of the hub 13 and to provide an abutting surface 26 for a spring 27 retained on the lug 19 of the hub 13. See FIGS. 3 and 4. The surface 26 may be suitably angled as shown in FIG. 3, or provided with a dimple or detent 28 adapted to receive the end of the spring 27, as shown in FIG. 4. These modifications serve to substantially prevent the spring 27 from dislodging from its abutting position with respect to the surface 26. The spring 27 is sufficiently strong to exert a force on the abutting surface 26 of the end 25 to normally urge the end 25 into proximity to the opposite end 23 of the sleeve 20 and thus substantially bridge the slot 18 in the hub 13.

In the embodiment of the sleeve 20 illustrated in FIGS. 7 and 8, one end 29 thereof is provided with a substantially L-shaped extension 30 adapted to be received by a substantially rectangular opening 31 to enable the extension 30 to engage with the sleeve 20'. This arrangement serves to keep the sleeve 20' properly aligned on the hub 13 and permits the sleeve 20' to be readily removed therefrom. The opposite end 32 of the embodiment of the sleeve 20 illustrated in FIGS. 7 and 8 is adapted to extend into the interior of the hub 13, and the spring abutting surface 33 thereof is desirably provided with a dimple or detent 34 to receive and retain an end of the spring 27. See FIG. 8 in particular.

Referring now in particular to FIGS. 9 and 10, an embodiment of the sleeve 20 is illustrated which eliminates the need for the spring 27. To achieve this result an end 35 of the sleeve 20" is advantageously constructed substantially in the form of a V, one leg 36 of the V abutting the lug 19 of the hub 13. The resiliency of the spring steel of which the sleeve 20" is most desirably fabricated is such that the lug 19 can bias the sleeve 20" in a direction which will permit the sleeve 20" normally to bridge the slot 18 in the hub 13, and yet enable the end 35 of the sleeve 20" to coact and cooperate with the lug 19 in the hub 13 to respond to and compensate for the jarring action which normally occurs at the instant that the sprocket-receiving openings of the film 22 engage with the pins 21 in the sleeve 20". The leg 36 of the V-shaped end 35 of the sleeve 20" may advantageously be provided with a lug receiving opening 37 to permit the leg 36 to more securely maintain its operative position with respect to the lug 19 of the hub 13.

In utilizing my film reel, it is first placed in position on the spindle 17 of a motion picture projector. The reel 10 when actuated by the spindle 17 will revolve in a clockwise direction as viewed in FIGS. 3 and 4. The film 22 is urged between flanges 11 and 12 and into contact with the sleeve 20 mounted on the hub 13. At the instant that the sprocket-receiving openings in the film 22 engage with the pins 21 in the sleeve 20, a force is exerted on the sleeve 20 which slidably propels the sleeve 20 in a counter-clockwise direction on the hub 13, the force being of sufficient magnitude to overcome the bias of the spring 27, or in the alternative, the bias produced by the resiliency of the spring steel of the V-shaped end 36. This sliding movement of the sleeve 20 on the hub 13 is adequate in its extent to compensate for and eliminate the jolting action occurring as the pins 21 grasp and draw the film 22 onto the reel 10. The responsive action of the mechanism is smooth, and the film 22 can be wound on the reel 10 without concern for tearing or mutilation thereof. As the film is convoluted on the reel 10, the sleeve 20 is returned to its normal position in relation to the hub 13 by the coaction of the lug 19 and the spring 27, or the V-shaped end 36 of the sleeve 20. In its normally biased position the mechanism is able to perform its function as effectively and as often as additional reels of film are guided into and wound onto the reel 10, the mechanism being self-adjusting after each such operation.

It will be apparent from the foregoing description that my invention efficiently and effectively solves a problem heretofore encountered with prior art apparatus. My film reel can be constructed at a cost which compares favorably with that of conventional reels, and, because of the small number of moving parts involved, it can be easily maintained. It will be apparent to those skilled in the art that changes may be made in details of construction and arrangement of parts without departing from the spirit and scope of my invention. I do not limit myself, therefore, to the exact form herein shown and described other than by the appended claims.

I claim as my invention:

1. A motion picture film reel comprising a power driven reel including spaced flanges and a connecting hub, means circumferentially movably carried by the hub having means for engaging with the sprocket-receiving openings of film to be wound on the reel, said first mentioned means including a resilient member abutting and cooperating with means in the hub for normally biasing said first mentioned means substantially circumferentially in the direction of the rotational movement of the reel and for resiliently permitting relative movement of said first mentioned means circumferentially with respect to said hub in the opposite direction when the sprocket-receiving openings in the film engage said second mentioned means.

2. A motion picture film reel comprising a power driven reel including spaced flanges and a connecting hub, means circumferentially movably carried by the hub having projections for engaging with the sprocket-receiving openings of film to be wound on the reel, said means including a resilient substantially V-shaped member abutting and cooperating with means in the hub for normally biasing said first mentioned means substantially circumferentially in the direction of the rotational movement of the reel and for resiliently permitting relative movement of said first mentioned means circumferentially with respect to said hub in the opposite direction when the sprocket-receiving openings in the film engage said second mentioned means.

3. A motion picture film reel comprising a power driven reel including spaced flanges and a connecting hub, the hub being provided with an extension thereon, means circumferentially movably carried by the hub having projections for engaging with the sprocket-receiving openings of film to be wound on the reel, said means including a resilient substantially V-shaped member abutting and cooperating with the extension of the hub to normally bias said means substantially circumferentially in the direction of the rotational movement of the reel and for resiliently permitting relative movement of said first mentioned means circumferentially with respect to said hub in the opposite direction when the sprocket-receiving openings in the film engage said second mentioned means.

4. A motion picture film reel comprising a power driven reel including spaced flanges and a connecting hub, the hub being provided with an extension integral therewith, a sleeve circumferentially movably carried by the hub having pins for engaging with the sprocket-receiving openings of film to be wound on the reel, and a resilient, substantially V-shaped member integral with the sleeve adapted to abut and cooperate with the extension of the hub to normally bias the sleeve substantially circumferentially in the direction of the rotational movement of the reel and for resiliently permitting relative movement of said first mentioned means circumferentially with respect to said hub in the opposite direction when the sprocket-receiving openings in the film engage said second mentioned means.

5. A motion picture film reel comprising a power driven reel including spaced flanges and a connecting hub, the hub being provided with a spring retaining member, a spring adapted to be received by the spring retaining member of the hub, and means movably carried by the hub having projections for engaging with the sprocket-receiving openings of film to be wound on the reel, said means including a member thereon abutting and cooperating with the spring to normally bias said means substantially in the direction of the rotational movement of the reel and to resiliently permit relative movement of said means with respect to said hub in the opposite direction when the sprocket-receiving openings in the film engage with the projections on the hub.

6. A motion picture film reel comprising a power driven reel including spaced flanges and a connecting hub, the hub being provided with a spring retaining member, a spring adapted to be received by the spring retaining member of the hub, and a sleeve movably carried by the hub having projections for engaging with the sprocket-receiving openings of film to be wound on the reel, the sleeve carrying a member adapted to abut and cooperate with the spring whereby the sleeve will normally be urged substantially in the direction of the rotational movement of the reel and will move relative to the hub in the opposite direction when the sprocket-receiving openings in the film engage with the projections on the sleeve.

7. A motion picture film reel comprising spaced flanges and a connecting hub, the ends of the hub terminating in spaced relation to provide a slot therein, one end of the hub having a spring retaining portion, a spring adapted to be received by the spring retaining portion of the hub, a sleeve movably carried by the hub provided with projections for engaging with sprocket-receiving openings in movie film to be wound on the reel, one end of the sleeve being adapted to engage with one end of the hub, the other end of the sleeve extending inwardly of the hub through the slot and abutting the spring.

8. A motion picture film reel comprising spaced flanges and a connecting hub, the ends of the hub terminating in spaced relation to provide a slot therein, one end of the hub having a spring retaining portion, a spring adapted to be received by the spring retaining portion of the hub, a sleeve provided with projections for engaging with sprocket-receiving openings in movie film to be wound on the reel, the sleeve being adapted to be received by and move relative to the hub, one end of the sleeve extending inwardly of the hub through the slot and abutting the spring, the other end of the sleeve being provided with means for engaging with the one end of the sleeve through an opening therein thereby to retain the sleeve in aligned relation with respect to the hub.

9. A motion picture film reel comprising spaced side plates and a connecting hub, the ends of the hub terminating in spaced relation to provide a slot therein, one end of the hub having a spring retaining portion, a spring adapted to be received by the spring retaining portion of the hub, a concentric sleeve adapted to be received by and move relative to the hub provided with projections for engaging with sprocket-receiving openings in movie film to be wound on the reel, one end of the sleeve extending inwardly of the hub through the slot and abutting the spring, the other end of the sleeve being provided with an L-shaped extension for engaging with the one end of the sleeve through an opening therein whereby the slot in the hub is substantially bridged by the sleeve.

10. A motion picture film reel comprising a power driven reel including spaced flanges for guiding the film and a connecting hub, means circumferentially movably carried by the hub having means for engaging with the sprocket-receiving openings of film to be wound on the reel, and resilient means connecting said first mentioned means to the hub for normally biasing said first mentioned means substantially circumferentially in the direction of the rotational movement of the reel and resiliently permitting relative movement circumferentially of said first mentioned means with respect to said hub in the opposite direction when the sprocket-receiving openings in the film engage said second mentioned means.

11. A motion picture film reel including a power driven hub, means circumferentially movably carried by the hub having means for engaging with the sprocket-receiving openings of film to be wound on the reel, and resilient means connecting said first mentioned means to the hub for normally biasing said first mentioned means substantially circumferentially in the direction of the rotational movement of the reel and resiliently permitting relative movement circumferentially of said first mentioned means with respect to said hub in the opposite direction when the sprocket-receiving openings in the film engage said second mentioned means.

12. A motion picture film reel including a power driven hub, a second hub circumferentially movably carried by the first hub and having means for engaging with the sprocket-receiving openings of film to be wound on the reel, flanges carried by one of said hubs for guiding the film thereon, and resilient means connecting said second mentioned hub to said first mentioned hub for normally biasing said second mentioned hub substantially circumferentially in the direction of the rotational movement of the first mentioned hub and resiliently permitting relative movement of said second mentioned hub circumferentially with respect to said first mentioned hub in the opposite direction when the sprocket-receiving openings in the film engage said first mentioned means.

References Cited by the Examiner
UNITED STATES PATENTS 931,758 8/09 Harthan.
2,225,433 12/40 Goldberg _____ 242—71.4
2,662,696 12/53 Nerwin.

MERVIN STEIN, *Primary Examiner.*

HARRISON R. MOSELEY, *Examiner.*